Patented Apr. 28, 1936

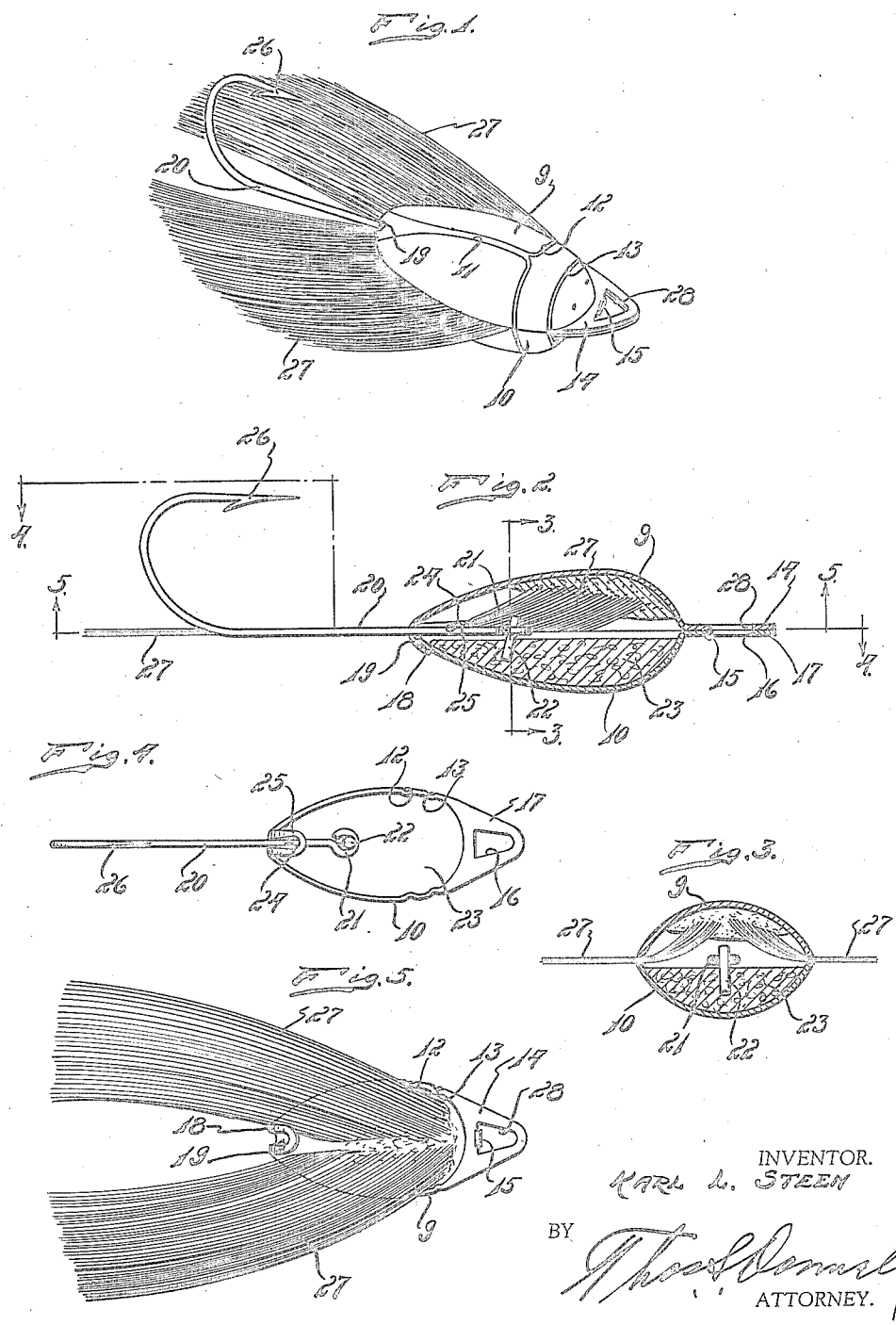

2,039,039

UNITED STATES PATENT OFFICE 2,039,039

ARTIFICIAL BAIT

Karl L. Steen, Detroit, Mich.

Application March 7, 1934, Serial No. 714,383

9 Claims. (Cl. 43—42)

My invention relates to a new and useful improvement in an artificial bait adapted for use in connection with a line for casting, trolling or the like. It is an object of the present invention to provide a bait in which the lure of the bait will be increased to the maximum due to its shape and ornamentation as well as its construction.

Another object of the invention is the provision of an artificial bait having a hook securely fastened thereto in such a manner that it may be easily and quickly removed and replaced.

Another object of the invention is the provision of a bait of this class so arranged and constructed that while it resembles a natural form or shape of fish bait it will always be maintained with a certain side facing upwardly.

Another object of the invention is the provision of a bait of this class which will be simple in structure, economical of manufacture, durable, highly efficient in use, light and easily and quickly attached for use.

Other objects will appear hereinafter.

The invention consists in the combination and arrangement of parts hereinafter described and claimed.

The invention will be best understood from a reference to the accompanying drawing which forms a part of this specification and in which, Fig. 1 is a perspective view of the invention, Fig. 2 is a longitudinal, central sectional view of the invention, Fig. 3 is a sectional view taken on line 3—3 of Fig. 2, Fig. 4 is a view taken on line 4—4 of Fig. 2, Fig. 5 is a view taken on line 5—5 of Fig. 2.

While it is believed obvious that many of the features of the invention may be employed on any artificial bait regardless of its shape or form, I have, in the drawing illustrated the invention applied to an artificial bait constructed to resemble a beetle bug.

The device comprises a shell formed from a pair of hollow sections 9 and 10, fabricated from metal or other suitable material which may be sufficiently light and durable for the purposes intended. Each of these sections is provided with a longitudinally extending groove 11 on its outer surface extending across the rear portion thereof and opening at its forward end into the transverse or encircling groove 12 which is spaced rearwardly from the transverse or encircling groove 13.

Extended outwardly from the forward end of the section 9 is a tongue 14 having the resilient snap or locking tongue 15 punched therefrom at the rear of the opening 28. This snap or locking tongue 15 is angularly turned to extend through the opening 16 formed in the tongue 17 and snap over the edge thereof. This tongue 17 projects forwardly from the section 10. At the rear of the section 9 there is formed an outwardly projecting tongue 18 which is angularly turned to extend in a curve corresponding to the contour of the section or shell 10. An elongated slot 19 is formed in the tongue 18 and through this slot extends the shank 20 of a fish hook. The eye-let 21 of this hook embraces the stud 22 which is embedded in and projects outwardly from the filling 23 positioned in the section 10. This filling is preferably lead or other suitable weighty material so that the assembled bait, when placed in the water, will lie with the section 10 down. The shank 20 also extends through the slot 24 formed in the tongue 25 which projects from the rear end of the section or shell 10 and is turned inwardly thereof. The hook portion 26 of the fish hook will always be faced upwardly when the body is positioned with the section 10 downwardly. This will eliminate the catching of the barb of the hook in weeds and the like as the hook is dragged through the water. The hairs or "buck tail" 27 which are fastened to the section 9 and project outwardly from between the meeting edges of the sections 9 and 10 will serve as a deflecting means for brushing aside small weeds and grass through which the hook may be drawn. The section 10 is slightly deeper than the section 9.

As shown in Fig. 1 and Fig. 5 the tongue 14 is provided with an opening 28. When the sections are in assembled relation this opening will register with the opening 16 in the tongue 17 and provide an eye-let to which a spinner or the lead line may be fastened.

In assembling the device the hook shank 20 will be projected through the slot 24 by passing the barbed end through this slot. The eye-let 21 will then be placed over the stud 22. The tongue 18 will then be threaded onto the shank 20 and brought into engagement with the section 10 and the tongue 15 is then snapped over the edge of the opening 16 to secure these parts together, with the tongues 14 and 17 in snug engagement with each other and the edges of each of the sections 9 and 10 in engagement with each other. It is obvious that the sections may be easily and quickly unsnapped from each other so that the hook may be easily and quickly removed and replaced with another of a different size or formation. Thus it is possible to use the same bait for use in catching different kinds and sizes of fish with little inconvenience to the user in making the necessary change of hook.

While I have illustrated and described the preferred form of construction I do not wish to limit myself to the precise details of structure shown but desire to avail myself of such variations and departures therefrom as may come within the scope of the appended claims.

Having thus described my invention, what I claim as new and desire to secure by Letters Patent is:

1. An artificial bait of the class described comprising a body formed from a pair of hollow sections; means for snapping said sections upon each other to provide a substantially unitary structure; and means carried by one of said sections for detachably connecting a fish hook thereto.

2. An artificial bait of the class described, comprising a hollow body formed from a pair of sections; springable means for securing said sections in fixed relation to each other; means carried by one of said sections for detachably connecting a hook thereto; and means projecting from each of said sections for affording a connection portion for a line.

3. An artificial bait of the class described, comprising a pair of hollow sections; an engagement portion on one of said sections for engaging over the end of the other section; and a snap member at the opposite end of said sections for snapping into position and retaining said sections in fixed relation to each other.

4. An artificial bait of the class described, comprising a hollow body formed from a pair of sections, one of said sections having an angularly turned tongue at one end provided with an elongated slot, and adapted for engaging against the adjacent end of the other section, said other section having an opening formed at its opposite end outwardly thereof; a snap member on said first named section for snapping into said opening and retaining said sections in fixed relation; and means within one of said sections for engaging and detachably connecting a fish hook, the shank of said hook projecting outwardly from said section through said slot.

5. An artificial bait of the class described, comprising a pair of sections; a tongue projecting outwardly from adjacent ends of each of said sections, each of said tongues having an opening formed therein, one of said tongues having a snap member for snapping over the edge of the opening in the other tongue; a tongue at the opposite end of one of said sections engageable with the other of said sections, said tongue having a slot formed therein; and means within one of said sections for detachably engaging the end of a fish hook shank for securing said hook to said body, said shank projecting outwardly through said slot.

6. An artificial bait of the class described, comprising a pair of sections; a tongue projecting outwardly from adjacent ends of each of said sections, each of said tongues having an opening formed therein, one of said tongues having a snap member for snapping over the edge of the opening in the other tongue; a tongue at the opposite end of one of said sections engageable with the other of said sections, said tongue having a slot formed therein; means within one of said sections for detachably engaging the end of a fish hook shank for securing said hook to said body, said shank projecting outwardly through said slot; and laterally projecting deflecting means carried by one of said sections and extending rearwardly from the edge thereof at opposite sides of said hook.

7. An artificial bait of the class described comprising a pair of sections, a tongue projecting outwardly from the forward end of each of the said sections, to provide line attaching means; engaging means carried by one of said sections for engaging the rear end of the forward section; a tongue on the opposite end of one of said sections engageable with the other of said sections and adapted for snapping over the same and retaining said sections in assembled relation, said engaging means having an opening formed therein; and means within one of said sections for detachably engaging the end of a fish hook shank for securing said hook to said body said shank projecting out through said last named opening.

8. An artificial bait of the class described comprising a body formed from a pair of sections; means for securing said sections in overlying relation with the edges of each section registering with the edges of the other section; and a plurality of hair-like deflecting members secured at one of their ends to one of said sections inwardly of the opposite edges thereof and projecting outwardly at their free ends between said sections from opposite sides of said body.

9. An artificial bait of the class described, comprising a body formed from a pair of sections; means for securing said sections in over-lying relation with the edges of each section registering with the edges of the other section; a plurality of hairlike deflecting members secured at one of their ends to one of said sections inwardly of the edge and projecting outwardly at their free ends between said sections from one side of said body; and a plurality of hairlike deflecting members secured at one of their ends inwardly of the opposite edge of said section and projecting outwardly at their free ends between said sections from the opposite sides of said body.

KARL L. STEEN.